United States Patent
Parisy et al.

(10) Patent No.: US 8,070,452 B2
(45) Date of Patent: Dec. 6, 2011

(54) BLADE PROVIDED WITH A HORIZONTALLY-WOUND SPAR, AND A METHOD OF FABRICATING SUCH A SPAR

(75) Inventors: Jean-Marie Parisy, Paris (FR); Jean-François Hirsch, Aix En Provence (FR)

(73) Assignee: Eurocopter, Marignane Cedex (FR)

( * ) Notice: Subject to any disclaimer, the term of this patent is extended or adjusted under 35 U.S.C. 154(b) by 834 days.

(21) Appl. No.: 12/144,676

(22) Filed: Jun. 24, 2008

(65) Prior Publication Data

US 2009/0010764 A1    Jan. 8, 2009

(30) Foreign Application Priority Data

Jul. 2, 2007 (FR) ...................... 07 04744

(51) Int. Cl.
*B64C 11/26* (2006.01)

(52) U.S. Cl. .................... 416/226; 416/219 R; 264/339; 264/241

(58) Field of Classification Search .................. 416/226, 416/219; 264/339, 241
See application file for complete search history.

(56) References Cited

U.S. PATENT DOCUMENTS

| | | | |
|---|---|---|---|
| 3,923,422 A * | 12/1975 | Ianniello et al. | 416/226 |
| 4,096,012 A | 6/1978 | Belko et al. | |
| 4,460,531 A * | 7/1984 | Harris et al. | 264/138 |
| 4,626,173 A * | 12/1986 | Mouille et al. | 416/134 A |
| 5,632,602 A | 5/1997 | Herrmann et al. | |
| 6,893,223 B2 * | 5/2005 | Roberts | 416/210 R |

FOREIGN PATENT DOCUMENTS

| | | |
|---|---|---|
| FR | 2 186 380 A | 11/1974 |
| FR | 2 362 750 A | 3/1978 |
| GB | 2 262 966 A | 7/1993 |

* cited by examiner

*Primary Examiner* — Leonardo Andujar
(74) *Attorney, Agent, or Firm* — Brooks Kushman P.C.

(57) ABSTRACT

The present invention relates to a rotorcraft blade (1) provided with a distributed spar (10) on a leading edge (4), a suction side (2), and a pressure side (3) of the blade, and the invention also relates to a method of fabricating such a spar. The blade is provided with a fastener insert (20) integrated in the blade root for the purpose of fastening the blade to a rotor, the fastener insert (20) comprising a horizontal shaft (21) perpendicular to the span of the blade and to an axis of rotation of said rotor, with the distributed spar (10) of the blade being wound in part about the horizontal shaft.

11 Claims, 1 Drawing Sheet

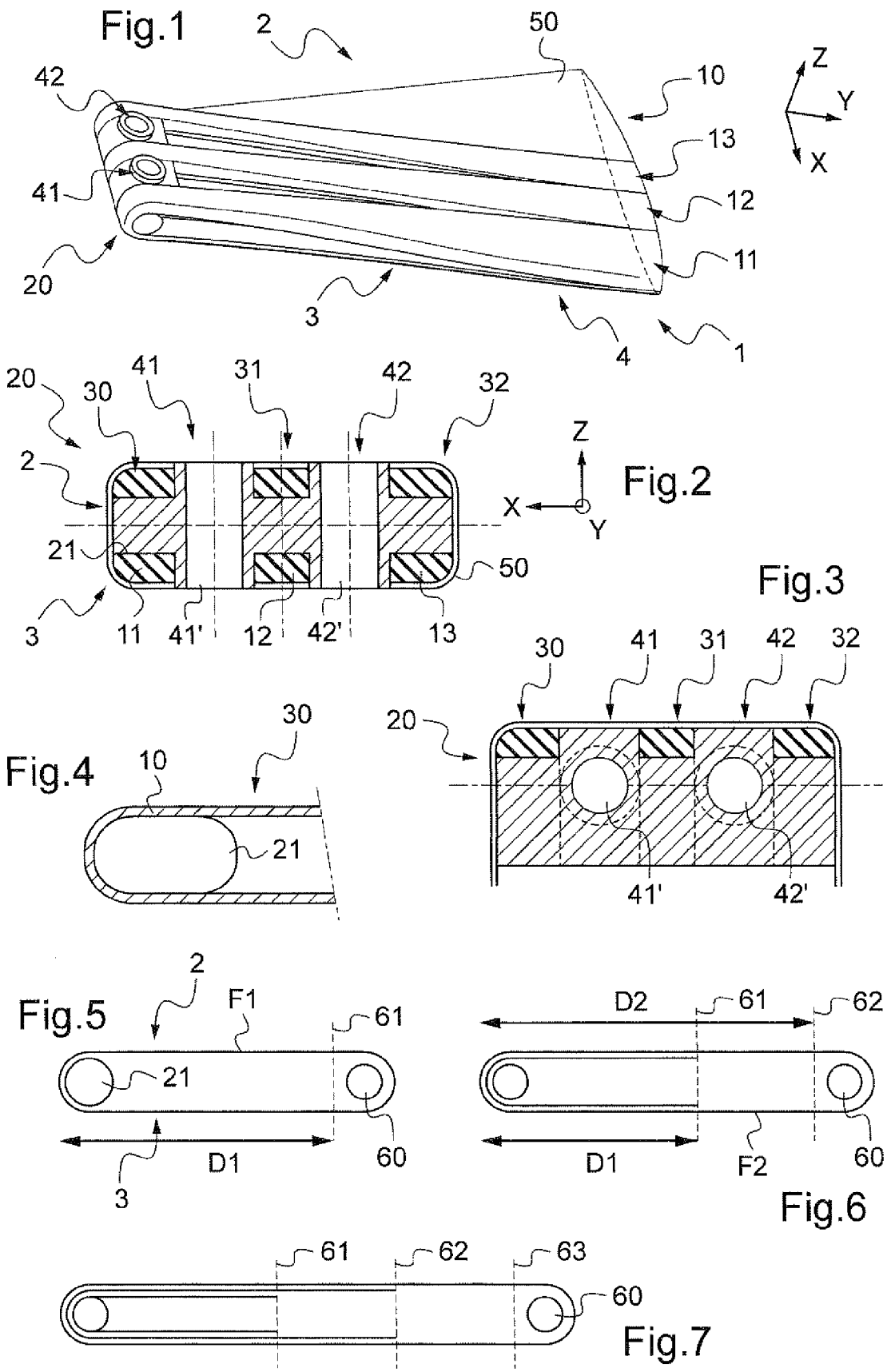

BLADE PROVIDED WITH A HORIZONTALLY-WOUND SPAR, AND A METHOD OF FABRICATING SUCH A SPAR

The present invention relates to a rotorcraft blade provided with a horizontally-wound spar, and also to the method of fabricating the spar.

BACKGROUND OF THE INVENTION

A rotorcraft is provided with at least one engine that drives the main rotor for the purpose of providing the vehicle with lift and also with propulsion. The rotor comprises a hub that is set into motion by a rotor shaft driven by the engine, and on which a plurality of blades are arranged.

As they rotate, the blades are subjected to a torser of forces, and consequently they are subjected to centrifugal force and also to multiple forces due to flapping, drag, and twisting, where twisting is caused in particular by changes of pitch for the purpose of altering the angle of inclination of the blade relative to the plane of the hub.

In addition, the hub generally has a plurality of arms, possibly flexible in flapping, with the blades being arranged at the ends of the arms. The forces due in particular to centrifugal force are then transmitted to the non-flexible central zone of the hub by the spar of the blade.

A first type of blade is known that is fitted with a spar extending from the root of the blade along the span of the blade and being arranged at the leading edge of the blade. That type of spar is referred to as a "leading-edge spar" for convenience in the text below.

That type of spar is effective, but appears to be insufficient for modern blades that present shapes that are complex, e.g. for acoustic reasons.

A second type of blade is known that has a spar referred to as a distributed spar. Such a spar consists in a leading-edge spar that is extended by two portions placed flat, respectively on the suction side and the pressure side of the blade.

Nevertheless, it is difficult to attach a blade fitted with a distributed spar to a rotor hub.

U.S. Pat. No. 3,923,422 discloses a device for performing such a function. At the root of the blade, the distributed spar is wound around a vertical axis parallel to the axis of rotation of the rotor.

Nevertheless, in order to perform such a vertical winding, it is necessary to twist the portion of the spar that is placed flat on the suction side and on the pressure side of the blade. Such twisting through about ninety degrees presents the drawback of being potentially destructive insofar as the spar is constituted mainly by unidirectional fibers for blades made out of composite material.

It is also difficult to place the unidirectional fibers coming from the twisted section of the distributed spar flat on the suction side and the pressure side of the blade.

Twisting can then lead to poor reproducibility in terms of shape and also in terms of mechanical and vibratory characteristics from one blade to another.

Furthermore, if filler elements need to be arranged in the blade, they will be of complex shape and will vary from one blade to another because the twisting of the spar is not reproduced identically. It thus becomes difficult to automate blade manufacture.

It is then possible to envisage winding the spar "horizontally" in accordance with the proposal described by French patent No. 2 186 380.

Nevertheless, that solution is proposed solely for a spar that is placed flat on the suction side and the pressure side of the blade, but not on the leading edge of the blade. Consequently, that does not constitute a distributed spar but a spar of a completely different type. In addition, French patent No. 2 186 380 does not present any teaching relating to the method that enables horizontal winding to be performed.

Finally, that blade does not include fastener means. It is then arranged in an arm of a rotorcraft hub of a very special shape and is then secured to said arm by means of a pin passing through the arm to lock the spar of the blade where the spar is wound.

Presumably to prevent excessive flapping of the blade, the arm comprises top and bottom plates clamped onto the spar of the blade.

The blade of French patent No. 2 186 380 is thus a specific blade that does not have a distributed spar and that is suitable for fitting only to a special type of rotor hub.

OBJECTS AND SUMMARY OF THE INVENTION

An object of the present invention is to provide a blade provided with a distributed spar that can be arranged on most existing rotors, that makes it possible to avoid the abovementioned drawbacks, and in which the distributed spar does not present a segment twisted through ninety degrees.

According to the invention, a rotorcraft blade is provided with a distributed spar on a leading edge, a suction side and a pressure side of the blade. The blade is remarkable in that it is provided with a fastener insert integrated in the blade root for fastening the blade to a rotor, the fastener insert including a horizontal shaft, i.e. a shaft that is substantially perpendicular to the span of the blade and to an axis of rotation of the rotor, with the distributed spar of the blade being wound in part about the horizontal shaft.

The blade thus possesses an integrated fastener insert that enables it to be fastened to a variety of hubs, thus conferring a universal nature of the blade of the present invention.

Furthermore, the blade has a horizontal distributed spar that is wound horizontally around a horizontal shaft of the fastener insert at the blade root. The risks associated with twisting the spar through ninety degrees are necessarily absent from this blade.

Advantageously, the horizontal shaft comprises at least one winding zone around which the spar of the blade is wound, and at least one fastener zone for fastening the fastener insert to the rotor.

The horizontal shaft is thus secured to the blade via its winding zone(s), which implies that the fastener insert is an integral portion of the blade.

Furthermore, the horizontal shaft is also provided with at least one fastener zone, whereby the blade can be fastened to the rotor hub of a rotorcraft.

In a preferred embodiment, each fastener zone is arranged between two winding zones. The horizontal shaft is then provided with a number of winding zones that is one greater than the number of fastener zones.

When the horizontal shaft is provided in particular with three winding zones, the horizontal shaft possesses two fastener zones. Thus, the horizontal shaft comprises in succession a first winding zone, a first fastener zone, a second winding zone, a second fastener zone, and then a third winding zone.

This configuration is particularly suitable because of the presence of a distributed spar. The distributed spar then comprises three distinct tapes placed adjacent to one another in the main portion of the blade, one tape for the portion of the spar that is arranged at the leading edge of the blade, and two tapes for the portion of the spar that extends flat over the suction side and over the pressure side of the blade.

In addition, since rotorcraft rotor hubs usually provide vertical means for fastening the blade to the hub, the fastener insert is provided with at least one hollow vertical fastener bore, i.e. of axis parallel to the axis of rotation of the rotor, and passing through a respective one of each of the fastener zones of the horizontal shaft.

Thus, the vertical fastener means of the hub can pass through the vertical fastener bore of the fastener insert in order to fasten the blade to the hub. There is therefore no need to use a special hub for installing the blade on the hub.

The blade of the invention can thus be fitted to existing hubs without extra financial costs.

In addition, it is advantageous for each winding zone of the horizontal shaft to present a profile that is oblong, i.e. longer than it is wide, and provided with rounded ends. The contact area between the horizontal shaft and the spar is then optimized, thereby guaranteeing good adhesion between the fastener insert and the distributed spar. In addition, such contact maximizes the transmission of the forces to which the blade is subjected from the distributed spar to the hub via the horizontal shaft.

Finally, said at least one fastener zone projects relative to said at least one winding zone by a thickness that preferably corresponds to at least the thickness of the distributed spar around the entire periphery of said at least one winding zone that is in contact with said distributed spar.

In a variant, if the distributed spar is covered in a covering, said at least one fastener zone can then project relative to said at least one winding zone by a thickness that corresponds at least to the sum of the thicknesses of the distributed spar plus the covering.

Consequently, the fastener zone(s) project(s) from the insert relative to the winding zones. Nevertheless, once winding has been completed, the spar fills in the spaces left therebetween, thereby giving the overall assembly a compact nature and the required strength.

The present invention also provides a method enabling a spar to be wound around the fastener insert of the blade of the invention.

Thus, the invention provides a method of winding a spar of a rotorcraft blade around a horizontal shaft of a fastener insert of said blade, said spar being a distributed spar on a leading edge and on two outside surfaces representing a suction side and a pressure side of said blade, said spar comprising at least one longitudinal tape made up of a plurality of superposed inorganic fibers, e.g. unidirectional inorganic fibers made of carbon or of glass, which method is remarkable in particular in that the following steps are performed in succession:

a) placing a first fiber on an outer surface of the blade;

b) winding said first fiber around said horizontal shaft and then placing it on the other outer surface of the blade so that said first fiber forms an elongate shape to cover said suction side and said pressure side of the blade at least in part over a first length starting from the root of the blade; and c) repeating steps a) and b) with a second fiber that is placed on said first fiber, the second fiber covering said suction side and said pressure side of the blade at least in part over a second length starting from the root of the blade, the second length being longer than said first length.

Advantageously, step c) is repeated at least once with the lengths of the suction side and of the pressure side that are covered by the fiber that is placed on the blade being increased on each occasion.

Consequently, the spar comprises a plurality of superposed fibers, the second fiber being longer than the first fiber, the third fiber being longer than the second fiber, and so on. Thus, the spar has a thickness that decreases progressively from the root of the blade to its free outer end. This characteristic makes it possible to optimize the weight of the spar without penalizing its performance, since the mechanical stresses on the free outer end of the blade are smaller than those at the root of the blade.

In addition, it is found that each fiber of the spar is easily wound around the horizontal shaft of the fastener insert, thus ensuring good reproducibility for the blades.

In a variant of the method, during step b), the first fiber is wound around the horizontal shaft and a mounting shaft is placed between the root of the blade and the free outer end of the blade so as to obtain a hollow elongate cylinder, and then the first fiber is cut at the mounting shaft so as to obtain the elongate C-shape.

Similarly, during step c), the mounting shaft is shifted towards the tip of the blade and step b) is repeated with a second fiber.

The process is then repeated until the distributed spar reaches the required dimensions, i.e. The required thickness and length.

In order to wind the fibers properly, the operator thus makes use of two shafts, the horizontal shaft of the fastener insert and a mounting shaft. Nevertheless, the mounting shaft has no other function and the operator cuts the fiber to the desired length over the suction side and over the pressure side and then removes the mounting shaft. The operator then moves the mounting shaft so as to repeat the operation with another fiber of the spar.

Finally, the method of the invention is associated with the blade of the invention by a common inventive concept seeking to make a blade having a distributed spar with good reproducibility, guaranteeing its mechanical and aerodynamic performance. Steps a) to c) of the method are optimized if they are implemented on a blade of the invention.

BRIEF DESCRIPTION OF THE DRAWINGS

The invention and its advantages appear in greater detail in the context of the following description of an embodiment given by way of illustration with reference to the accompanying figures, in which:

FIG. 1 is a diagrammatic view of the root of a blade of the invention;

FIGS. 2 to 4 are sections through the fastener insert of said blade; and

FIGS. 5 to 7 are diagrams explaining the method of the invention.

Elements present in two or more distinct figures are given the same references in each of them.

MORE DETAILED DESCRIPTION

FIG. 1 is a diagrammatic view of a blade 1 of the invention.

The blade 1 is provided with a distributed spar 10 that extends along the span of the blade 1, along the second horizontal axis Y.

Furthermore, the blade 1 includes a fastener insert 20 at the root of the blade in order to enable it to be fastened to a hub of the rotorcraft.

It should be observed that the blade 1 is covered in an outer covering 50, this covering contributing little or nothing to transmitting the forces to which the blade 1 is subject to the rotor hub of the rotorcraft, unlike the distributed spar 10.

The distributed spar 10 is provided with three tapes 11, 12, 13 that are adjacent to one another, each tape 11, 12, 13 including inorganic fibers.

The first tape 11 covers the leading edge 4 of the blade on its suction side 2 and is then wound in part around the fastener insert 20, going round half a circumference, after which it covers the leading edge 4 of the blade over its pressure side 3.

The second and third tapes 12 and 13 cover the suction side 2 of the blade 1. These second and third tapes 12, 13 are wound in part around the fastener insert 20, over half a circumference thereof, and then they cover the pressure side 3 of the blade 1.

Thus, the distributed spar 10 has an elongate C-shape.

In addition, the first, second, and third tapes 11, 12, and 13 of the distributed spar 10 are adjacent in pairs over the main portion of the blade, thereby forming a continuous surface. However, at the root of the blade, these first, second, and third tapes 11, 12, and 13 are no longer in contact with one another so as to avoid covering fastener zones of the insert for fastening to the rotor hub.

FIG. 2 is a section through the fastener insert 20, seen from the rotor hub of the rotorcraft.

The fastener insert 20 comprises a horizontal shaft 21 that extends along a first horizontal axis X. This horizontal shaft 21 is thus perpendicular to the span of the blade 1 that extends along the second horizontal axis Y. Furthermore, the horizontal shaft 21 is perpendicular to the axis of rotation of the rotor of the rotorcraft which extends along an elevation axis Z.

Furthermore, the horizontal shaft 21 is provided with winding zones 30, 31, 32 and with fastener zones 41, 42, each fastener zone lying between two winding zones.

The fibers constituting the first, second, and third tapes 11, 12, and 13 are thus wound around the winding zones 30, 31, 32 of the horizontal shaft 21. In contrast, the fastener zones 41, 42 are not covered by the distributed spar 10.

The fastener zones are thus separate from the winding zones, which is particularly advantageous. It is possible to increase the sectional area of the profile of the distributed spar by increasing the widths of the first and third tapes 11, 13 without changing the blade-to-hub interface. A blade that generates high levels of force can then be arranged on a hub designed for smaller force levels.

In addition, the fastener zones 41, 42 project from the winding zones by a thickness that corresponds to the thickness of the tapes of the spar, over the entire peripheries of the winding zones that come into contact with the distributed spar 10.

Thus, in FIG. 1, it can be seen that the fastener zones project from the winding zones both on the suction side 2 and on the pressure side 3 of the blade.

However, with reference to FIG. 3, which is a plan view, the fastener zones project from the winding zones on the side of the fastener insert 20 that is closest to the hub, once the blade 1 has been arranged on the hub. In order to obtain an elongate C-shape, the spar goes around only a portion of the fastener insert, which explains this configuration.

Consequently, the fastener insert is a one-piece unit that comprises in succession winding zones and fastener zones. In addition, the distributed spar 10 is wound in part around the winding zones so as to form an assembly that is compact, having neither indentations nor projections.

Furthermore, each of the fastener zones 41, 42 has a hollow vertical fastener bore 41', 42' that passes through the fastener insert 20 vertically, along the elevation axis Z that is parallel to the axis of rotation of the rotor.

Conventional fastener means are then inserted in the vertical bores 41', 42' for fastening the blade to the hub of the rotor.

FIG. 4 is a section through the fastener insert on the first horizontal axis X.

This FIG. 4 shows more particularly a winding zone 30 on the horizontal shaft 21 that presents a profile that is oblong, presenting plane bottom and top portions and rounded ends. The horizontal shaft 21 is thus in the form of an oblong cylinder, thereby maximizing contact with the distributed spar 10 compared with other shapes, e.g. a cylindrical shape.

FIGS. 5 to 7 are diagrammatic views explaining the method that is implemented for fabricating a distributed spar of the invention which is wound in part around a horizontal shaft 21.

With reference to FIG. 5, during a step a), an operator places a first fiber F1 of the distributed spar 10 on an outside surface of the blade, e.g. its pressure side 2.

During a step b), the operator winds this first fiber F1 around the horizontal shaft 21 of the fastener insert 20 of the blade. The operator then places the first fiber F1 on the other outside surface of the blade, its pressure side 3, so that the first fiber is given an elongate C-shape covering at least part of the suction and pressure sides of the blade over a first length going from the root of the blade.

In a variant of the invention, during step b), the operator uses a mounting shaft 60 to facilitate winding the first fiber F1. The operator then winds the first fiber F1 easily around the horizontal shaft 21 and the mounting shaft 60.

Once winding has been achieved, the operator cuts the first fiber in a direction 61 and removes the mounting shaft 60 and the excess fiber covering said mounting shaft.

Consequently, the first fiber has the desired elongate C-shape and covers the suction side 2 and the pressure side 3 over a first length D1 from the root of the blade.

With reference to FIG. 6, above steps a) and b) are repeated with a second fiber F2 that is placed on the first fiber F1, the second fiber covering the suction and pressure sides of the blade at least in part over a second length D2 starting from the root of the blade.

In a variant of the invention, the operator makes use of the mounting shaft 60 to facilitate winding, taking care to shift the mounting shaft so as to bring it closer to the free outer end of the blade.

The second length D2 over which the suction and pressure sides are covered by the second fiber F2 is thus longer than the first length D1 covered by the first fiber F1. With reference to FIG. 7, the steps are repeated with a third fiber, continuing to take care to increase the length of the suction and pressure sides that is covered by the new fiber.

Thereafter the method is repeated as often as necessary so as to obtain the first, second, and third tapes 11, 12, and 13.

A spar is thus obtained that is provided with a plurality of superposed inorganic fibers constituting these first, second, and third tapes 11, 12, and 13, the thickness of the spar tapering from the root of the blade towards its free outer end.

When the distributed spar has a plurality of adjacent tapes, each tape is then obtained by implementing the above-explained method.

Naturally, the present invention can be subjected to numerous variants as to its implementation. Although one embodiment is described above, it will readily be understood that it is not conceivable to identify exhaustively all possible embodiments. It is naturally possible to envisage replacing any of the means described by equivalent means without going beyond the ambit of the present invention.

What is claimed is:

1. A rotorcraft blade (1) provided with a fastener insert (20) integrated in the blade root for fastening the blade to a rotor, the blade being provided with a distributed spar (10) on a leading edge (4), a suction side (2), and a pressure side (3) of the blade, said fastener insert (20) including a horizontal shaft (21) perpendicular to the span of the blade and to the axis of rotation of said rotor, with the distributed spar (10) of the blade being wound in part thereabout, said horizontal shaft (21) having at least one winding zone (30, 31, 32) around which the distributed spar (10) of the blade is wound, and at least one fastener zone (41, 42) for fastening said fastener insert (20) to said rotor, and each fastener zone (41, 42) is arranged between two winding zones (30-31, 31-32).

2. A rotorcraft blade according to claim 1, wherein said horizontal shaft (21) is provided with a number of winding zones (30, 31, 32) that is one greater than the number of fastener zones (41, 42).

3. A rotorcraft blade according to claim 1, wherein said fastener insert (20) is provided with at least one hollow vertical fastener bore (41', 42'), extending parallel to said axis of rotation of the rotor, and passing through a respective fastener zone of said horizontal shaft (21).

4. A rotorcraft blade according to claim 1, wherein each winding zone (30, 31, 32) of said horizontal shaft (21) presents a profile that is oblong.

5. A rotorcraft blade according to claim 1, wherein each fastener zone (41, 42) of said horizontal shaft (21) presents a profile that is oblong.

6. A rotorcraft blade according to claim 1, wherein said at least one fastener zone (41, 42) projects from said at least one winding zone (30, 31, 32) around the entire periphery of said at least one winding zone (30, 31, 32) that is in contact with the distributed spar (10).

7. A rotorcraft blade according to claim 6, wherein said at least one fastener zone (41, 42) projects from said at least one winding zone (30, 31, 32) by a thickness corresponding at least to the thickness of the distributed spar (10).

8. A method of winding a spar of a rotorcraft blade around a horizontal shaft (21) of a fastener insert (20) of said blade, said spar being a distributed spar (10) on a leading edge (4) and on two outside surfaces representing a suction side (2) and a pressure side (3) of said blade, said spar comprising at least one longitudinal tape (11, 12, 13) made up of a plurality of superposed inorganic fibers (F1, F2), the method comprising the following steps:
   a) placing a first fiber (F1) on an outer surface (2) of the blade;
   b) winding said first fiber (F1) around said horizontal shaft (21) and then placing it on the other outer surface (3) of the blade so that said first fiber (F1) forms an elongate C-shape to cover said suction side (2) and said pressure side (3) of the blade at least in part over a first length (D1) starting from the root of the blade; and
   c) repeating steps a) and b) with a second fiber (F2) that is placed on said first fiber (F1), the second fiber (F2) covering said suction side (2) and said pressure side (3) of the blade at least in part over a second length (D2) starting from the root of the blade, the second length being longer than said first length (D1);

and wherein, during step b), the first fiber (F1) is wound around said horizontal shaft (21) and a mounting shaft (60) placed between the root of the blade and the tip of the blade so as to obtain a hollow elongate cylinder, and then the first fiber (F1) is cut at said mounting shaft (60) so as to obtain the elongate C-shape.

9. A method according to claim 8, wherein step c) is repeated at least once with the lengths of the suction side and of the pressure side that are covered by the fiber that is placed on the blade being increased on each occasion.

10. A method according to any claim 8, wherein, during step c), the mounting shaft is shifted towards the tip of the blade and step b) is repeated with a second fiber.

11. A method according to claim 8, wherein steps a) to c) are implemented on a blade according to claim 1.

* * * * *